Patented May 4, 1937

2,079,340

UNITED STATES PATENT OFFICE 2,079,340

FOOD PRODUCT

Herbert J. Smith, University City, Mo., assignor to Ralston Purina Company, St. Louis, Mo., a corporation of Missouri No Drawing. Application May 10, 1934, Serial No. 724,909

7 Claims. (Cl. 99—2)

My invention relates to feed products such as are suitable for feeding foxes, poultry or other carnivorous or omnivorous animals.

Prepared feeds for carnivorous animals should not comprise only meat, dried milk or similar substances composed largely of protein of animal origin, but should also contain cereals or other vegetable substances containing carbohydrates, it having been found that the inclusion of carbohydrate matter in the food is necessary to provide proper nourishment. Such animals in their wild state obtain carbohydrates, vitamines and probably other necessary food factors from the partially digested cereals, berries, buds and grasses in the stomachs and intestines of their prey, which necessary food factors are lacking in a meat diet. To the ingredients above stated, it is also preferable to add small quantities of molasses and cod liver oil, and it has been found that such mixed food is vastly superior to a straight meat diet for carnivorous animals. Foxes, for example, fed on this food, show not only an improvement in the quality of fur produced, but are much more fertile than those fed on meat alone.

It has been found that feed for omnivorous animals, such as poultry, and consisting largely of cereals, is improved in both nutritive and therapeutic value by the addition of animal proteins, preferably in the form of dried meat or fish meal.

While mixed feeds of the kinds above referred to are preferable to a diet of meat alone for carnivorous animals or cereals alone for omnivorous animals, they have an undue laxative effect upon these animals and much research has been devoted to the problem of devising a mixed feed having the qualities desirable for a complete ration for such animals which will not be subject to this disadvantage.

The product commercially known as "beet pulp" (the fibrous residuum resulting from the usual method of processing sugar beets in the manufacture of beet sugar, and which residuum is hereafter referred to as "beet fibre") has heretofore been fed to cattle, sheep and other herbivorous animals upon which it is known to have a pronounced laxative effect. I have discovered, however, that when beet fibre is fed to carnivorous or omnivorous animals it has the opposite action to that on herbivorous animals—that is, it acts as an effective counter-laxative. This was discovered by experimentation. For example, autopsies on foxes fed mixed foods of the kinds above referred to show the intestinal walls to be lined with a slimy mucous material which interferes with the proper assimilation of food and produces a laxative condition. The addition of beet fibre to the diet causes a marked change. The autopsies on animals fed a mixed feed containing beet fibre show an absence of this slimy coating on the intestinal walls. The intestines present a cleaner appearance similar to what is observed in foxes which are in the wild state. The clean intestinal wall presents a better surface for food assimilation and as a result the bowel movements are more nearly normal and the laxative tendency is corrected. The same observations have been made on dogs and on poultry. While I do not know to what physical or chemical conditions or reactions the result is attributable, I have found that it is only necessary to incorporate a suitable quantity of beet fibre in foods of the kinds hereinbefore mentioned to secure the desired correction of the undue laxative effect on such animals as foxes, dogs and poultry.

The specific ingredients composing the feeds may be varied, and also the relative proportions of the different types of ingredients may be considerably changed without departing from the spirit of my invention. The following are examples of suitable feeds for the animals named:

For dogs, dried meat 30%, dried milk 15%, cereals 34%, molasses 10%, cod liver oil 1%, and dried beet fibre 10%;

For foxes, dried meat 28%, dried milk 18%, cereals 35%, molasses 8%, cod liver oil 1%, and dried beet fibre 10%;

For poultry, cereals 69%, alfalfa meal 10%, soy bean meal 7%, meat scrap 10%, cod liver oil .5%, salt .5%, and dried beet fibre 3%.

Having fully described my invention, what I claim as new and desire to secure by Letters Patent of the United States is:

1. An animal feed comprising food ingredients which would otherwise have a laxative effect on the animal, but containing sufficient beet fibre to counteract the laxative effect.

2. An animal feed comprising animal protein, vegetable carbohydrates, and a relatively small quantity of beet fibre as a counter-laxative.

3. A mixed feed for carnivorous animals, comprising animal protein, vegetable carbohydrates, and beet pulp residuum from which the sugar content has been removed, the beet pulp forming approximately 10% of the feed.

4. A mixed feed for omnivorous animals, comprising animal protein, vegetable carbohydrates, and beet fibre, the beet fibre forming approximately 3% of the feed.

5. A dog feed comprising the following ingredients in approximately the proportions stated: dried meat 30%, dried milk 15%, cereals 34%, molasses 10%, cod liver oil 1%, and beet fibre 10%.

6. A fox feed comprising the following ingredients in approximately the proportions stated: dried meat 28%, dried milk 18%, cereals 35%, molasses 8%, cod liver oil 1%, and beet fibre 10%.

7. A poultry feed comprising the following ingredients in approximately the proportions stated: cereals 69%, alfalfa meal 10%, soy bean meal 7%, meat scrap 10%, cod liver oil .5%, salt .5%, and beet fibre 3%.

HERBERT J. SMITH.